US011384261B2

(12) United States Patent
Demarez et al.

(10) Patent No.: US 11,384,261 B2
(45) Date of Patent: Jul. 12, 2022

(54) RADIATION-ACTIVATABLE PRESSURE-SENSITIVE ADHESIVE TAPE HAVING A DARK REACTION AND USE THEREOF

(71) Applicant: TESA SE, Norderstedt (DE)

(72) Inventors: Clemence Demarez, Salon-de Provence (FR); Christian Schuh, Hamburg (DE)

(73) Assignee: TESA SE, Norderstedt (DE)

( * ) Notice: Subject to any disclaimer, the term of this patent is extended or adjusted under 35 U.S.C. 154(b) by 273 days.

(21) Appl. No.: 16/088,112

(22) PCT Filed: Mar. 14, 2017

(86) PCT No.: PCT/EP2017/055954
§ 371 (c)(1),
(2) Date: Sep. 25, 2018

(87) PCT Pub. No.: WO2017/174303
PCT Pub. Date: Oct. 12, 2017

(65) Prior Publication Data
US 2019/0077997 A1    Mar. 14, 2019

(30) Foreign Application Priority Data
Apr. 4, 2016   (DE) .................. 10 2016 205 524.0

(51) Int. Cl.
*C09J 7/38*   (2018.01)
*C08L 63/00*  (2006.01)
*C08K 5/55*   (2006.01)

(52) U.S. Cl.
CPC .............. *C09J 7/38* (2018.01); *C08L 63/00* (2013.01); *C08K 5/55* (2013.01); *C09J 2301/416* (2020.08); *C09J 2463/00* (2013.01); *C09J 2475/00* (2013.01); *Y10T 428/287* (2015.01); *Y10T 428/2896* (2015.01)

(58) Field of Classification Search
CPC ............. C09J 7/38; C08L 63/00; C08K 5/55
See application file for complete search history.

(56) References Cited

U.S. PATENT DOCUMENTS

| | | |
|---|---|---|
| 3,018,262 A | 1/1962 | Schroeder |
| 3,117,099 A | 1/1964 | Proops et al. |
| 3,640,937 A | 2/1972 | Thoma et al. |
| 3,658,746 A | 4/1972 | Rosendahl et al. |
| 3,729,313 A | 4/1973 | Smith |
| 3,741,769 A | 6/1973 | Smith |
| 4,058,401 A | 11/1977 | Crivello |
| 4,138,255 A | 2/1979 | Crivello |
| 4,231,951 A | 11/1980 | Smith et al. |
| 4,250,053 A | 2/1981 | Smith |
| 4,256,828 A | 3/1981 | Smith |
| 4,394,403 A | 7/1983 | Smith |
| 4,808,691 A | 2/1989 | Koenig et al. |
| 5,328,940 A * | 7/1994 | Zimmer ................ C08L 63/00 522/31 |
| 6,908,722 B2 | 6/2005 | Ebata et al. |
| 9,512,340 B2 | 12/2016 | Wigdorski et al. |
| 2005/0064333 A1* | 3/2005 | Crivello ................ G03F 7/038 430/270.1 |
| 2006/0100299 A1* | 5/2006 | Malik .................. G02F 1/1339 522/31 |
| 2010/0063221 A1 | 3/2010 | Manabe et al. |
| 2015/0322296 A1 | 11/2015 | Keite-Telgenbüscher et al. |
| 2016/0326413 A1* | 11/2016 | Schuh .................... C08L 75/04 |

FOREIGN PATENT DOCUMENTS

| | | |
|---|---|---|
| CN | 105073849 A | 11/2015 |
| DE | 1 770 245 U | 7/1958 |
| DE | 1 570 540 A1 | 3/1970 |
| DE | 1 902 931 A1 | 8/1970 |
| DE | 1 918 504 A1 | 10/1970 |
| DE | 1 770 591 A1 | 11/1971 |
| DE | 3 717 060 A1 | 12/1988 |
| DE | 10 2015 217 860 A1 | 11/2016 |
| EP | 0 276 716 | 8/1988 |
| EP | 0 542 716 B1 | 6/1997 |
| EP | 1 026 218 A1 | 8/2000 |
| EP | 1 073 697 B1 | 6/2002 |

(Continued)

OTHER PUBLICATIONS

Yokota Koichi et al., "Ultraviolet Curable Resin Composition", machine translation of JP2007119732A, May 17, 2007 (Year: 2007).*
International Search Report dated Apr. 12, 2017, dated Apr. 25, 2017.
English translation of International Search Report dated Apr. 12, 2017, dated Apr. 25, 2017.
German Search Report dated Feb. 2, 2017.
English translation of Office Action dated Jul. 3, 2020, and issued in connection with Chinese Patent Application No. 201780021025.1.

(Continued)

*Primary Examiner* — Anish P Desai
(74) *Attorney, Agent, or Firm* — Norris McLaughlin PA

(57) ABSTRACT

A pressure-sensitive adhesive tape comprising or consisting of a radiation-activatable polymerizable composition comprising or consisting of:
 A 5 to 60 parts by weight of at least one film former component;
 B 40 to 95 parts by weight of at least one epoxy component;
 C 0.1 to 10 parts by weight of at least one photoinitiator, and
 D optionally 0.1 to 200 parts by weight of at least one additive,
based in each case on the radiation-activatable polymerizable composition, where the parts by weight of components A and B add up to 100, wherein the film former component A comprises or consists of at least one polyurethane polymer and method of joining two components with the pressure-sensitive adhesive tape.

16 Claims, No Drawings

(56) References Cited

FOREIGN PATENT DOCUMENTS

| | | |
|---|---|---|
| EP | 1 518 912 A1 | 3/2005 |
| EP | 2 759 514 A1 | 7/2014 |
| JP | 2007119732 A | 5/2017 |
| WO | 92/20754 A | 11/1992 |
| WO | 2014093414 A1 | 6/2014 |

* cited by examiner

RADIATION-ACTIVATABLE PRESSURE-SENSITIVE ADHESIVE TAPE HAVING A DARK REACTION AND USE THEREOF

This is a 371 of PCT/EP2017/055954 filed 14 Mar. 2017, which claims foreign priority benefit under 35 U.S.C. 119 of German Patent Application 10 2016 205 524.0 filed Apr. 4, 2016, the entire contents of which are incorporated herein by reference.

The present invention relates to a pressure-sensitive adhesive tape comprising or consisting of a radiation-activatable polymerizable composition comprising or consisting of:
- A 5 to 60 parts by weight of at least one film former component;
- B 40 to 95 parts by weight of at least one epoxy component;
- C 0.1 to 10 parts by weight of at least one photoinitiator, and
- D optionally 0.1 to 100 parts by weight of at least one additive, based in each case on the radiation-activatable polymerizable composition, where the parts by weight of components A and B add up to 100. The invention further relates to a method of joining two components by means of such an adhesive tape and to the use thereof.

BACKGROUND OF THE INVENTION

The prior art discloses UV-curable adhesive tapes comprising epoxides inter alia. For instance, EP 1 026 218 A1 discloses a UV-curable pressure-sensitive adhesive (PSA) tape that uses onium-containing initiators inter alia. In order to enable sufficient open time, polyalkylene oxides are additionally used as retardants. In addition, the composition also contains hydroxy-functional compounds in a use amount of 5 to 50 in % by weight.

EP 2 759 514 A1 discloses UV-curable barrier adhesives. These adhesives may include a multitude of different initiators. The publication does not disclose, by contrast, which of these initiators should be used for rapid curing and simultaneously a sufficient open time.

EP 0 276 716 describes a curable composition composed of an epoxy resin and a UV catalyst. The composition contains a component having polyalkylene oxide units for prevention of immediate skin formation on commencement of UV irradiation. In the case of the compositions described here, it can be perceived as a disadvantage that it is necessary to use polyalkylene oxide compounds to prolong the open time, in that these compounds are not desirable for all applications of such adhesive tapes. The addition of such compounds can have a direct effect on bond strengths and aging resistance according to the type and amount. In particular, polar compounds such as polyalkylene oxides can have an adverse effect on resistance to moisture and heat.

EP 1 073 697 B1 discloses a curable composition containing 20% to 80% by weight of a curable epoxy resin, 20% to 80% by weight of a thermoplastic ethylene-vinyl acetate copolymer resin and an effective amount of a photocatalyst composed of a sulfonium salt or a salt having an organometallic cation. In the case of such compositions, it can be perceived as a disadvantage that either these do not have sufficient open time within which bonding of components can take place after UV irradiation of the adhesive tape or else no satisfactory curing takes place after the end of the irradiation (dark reaction). Specifically, the problem can arise here that it is possible to establish an adequate open time, but then the adhesive tapes are too slow to cure in the dark reaction. Alternatively, the reaction rate of the system is so high that the dark reaction proceeds sufficiently rapidly, but the initial crosslinking reaction proceeds so quickly that a sufficient open time cannot be achieved.

WO 92/20754 describes a photopolymerizable epoxy-based pressure-sensitive adhesive tape in which phenoxy resins are used as film formers. For control of the open time, polyols, for example polyether polyols, polyester polyols or polycaprolactone polyols, are described therein. As shown by the working examples in this publication, these adhesive tapes require thermal after-curing at 115° C. for about 20 minutes. This additional curing step not only entails elevated complexity in the use of such adhesive tapes, but also restricts the field of application thereof, since not all substrates to be bonded are amenable to such thermal stress.

EP 1 518 912 A1 describes an adhesive, an s-s adhesive tape and a d-s adhesive tape which are used for encapsulation of sensitive electronics. In order not to expose the sensitive electronics to the UV radiation necessary for curing, or if the $2^{nd}$ substrate is not transparent (for example owing to metal conductor tracks or other UV absorbers), the adhesives are activated with UV light prior to the joining of the second substrate. In order that there is still adequate bonding of the $2^{nd}$ substrate, a open time is required after activation. For this purpose, the curing reaction has to be inhibited, which is effected via the addition of aliphatic hydrocarbon compounds having hydroxyl groups or polyethers. In the examples, "reaction modifiers" of this kind are used and open times of up to 8 minutes are achieved (table 5, example 15). If no reaction modifiers of this kind are used, no open time is achievable (table 5, example 12&13), even though the photoinitiator used, by comparison with tetrakis(pentafluorophenyl)borate anion, is a slower initiator with an antimonate anion (preparation in example 12). For bonds having high strengths, adhesives with a minimum level of additions such as "reaction modifiers" are desirable since these control the open time, but can also disadvantageously affect the properties of the final bond.

OBJECT OF THE INVENTION

It was thus an object of the invention to provide a pressure-sensitive radiation-activatable adhesive tape which firstly has a sufficient open time of especially at least one minute, preferably at least 5 minutes, and after radiative activation shows a satisfactory dark reaction and good final bond strengths. The dark reaction is to be complete at room temperature particularly after no later than 24 hours. Moreover, the adhesive tape is to have satisfactory bond strengths of especially more than 2 MPa on steel. Moreover, the adhesive tape is not to require a thermal after-curing step at temperatures distinctly above room temperature, i.e. for example at more than 40° C.

SUMMARY OF THE INVENTION

This object is achieved in an adhesive tape of the type specified at the outset in that the film former component A comprises or consists of at least one polyurethane polymer. The present invention thus relates to a pressure-sensitive adhesive tape comprising or consisting of a radiation-activatable polymerizable composition comprising or consisting of:
- A 5 to 60 parts by weight of at least one film former component;

B 40 to 95 parts by weight of at least one epoxy component;

C 0.1 to 10 parts by weight of at least one photoinitiator, and

D optionally 0.1 to 200 parts by weight of at least one additive, based in each case on the radiation-activatable polymerizable composition, where the parts by weight of components A and B add up to 100, wherein the radiation-activatable polymerizable composition is characterized in that the film former component A comprises or consists of at least one polyurethane polymer.

The present invention is based on the finding that an adhesive tape having a composition of the aforementioned type firstly has an open time of typically one minute or more, especially at least 3 minutes, preferably of 5 minutes or more, and simultaneously, on conclusion of radiative activation, shows a dark reaction that enables complete curing of the adhesive tape or of the polymerizable composition at room temperature within 24 hours. Moreover, the compositions of the invention work without the use of the "reaction modifiers" described in the prior art. For that reason too, the adhesive tapes of the invention feature high bond strength, even without thermal aftertreatment.

Adhesives referred to as "pressure-sensitive" or as "pressure-sensitive" adhesives are those that even under relatively gentle pressure permit a lasting bond to the substrate and can be detached again from the substrate essentially without residue after use. In the context of the invention, a pressure-sensitive adhesive tape has a bonding force in the uncured state of at least 1 N/cm. The bonding force is determined here on steel analogously to ISO 29862:2007 (Method 3) at 23° C. and 50% relative humidity at a peel rate of 300 mm/min and a peel angle of 180°. The reinforcing film used is an etched PET film having a thickness of 36 µm, as obtainable from Coveme (Italy). The bonding of a test strip of width 2 cm is undertaken here by means of a 4 kg roll-on machine at a temperature of 23° C. The adhesive tape is pulled off immediately after application. The measurement (in N/cm) was found as the average from three individual measurements.

Pressure-sensitive adhesives have permanent pressure-sensitive adhesion at room temperature, i.e. have a sufficiently low viscosity and high touch-tackiness, such that they wet the surface of the respective substrate even at low contact pressure. The bondability of the adhesives is based on their adhesive properties, and the redetachability on their cohesive properties.

DETAILED DESCRIPTION

The (pressure-sensitive) adhesive tape of the invention may be configured without a carrier or with at least one carrier material. If a carrier material is present, it may have been provided on one or preferably both sides with a (pressure-sensitive) adhesive comprising or consisting of the radiation-activatable polymerizable composition of the invention. The carrier material includes all flat structures, for example films or film sections extending in two dimensions, tapes of extended length and limited width, tape sections, die-cut parts (for example in the form of edges or boundaries of an (opto-)electronic arrangement), multilayer arrangements and the like. For different applications, it is possible here to combine a wide variety of different carriers, for example films, weaves, nonwovens and papers, with the adhesives.

In addition, the expression "adhesive tape" also includes what are called "transfer adhesive tapes", i.e. an adhesive tape without a carrier. In a transfer adhesive tape, the adhesive that corresponds here to the adhesive tape is instead applied prior to application between flexible liners that have been provided with a release layer and/or have anti-adhesive properties. Application is regularly accomplished by first removing one liner, applying the adhesive/adhesive tape and then removing the second liner. The adhesive can thus be used directly for bonding of two surfaces. Such carrier-free transfer adhesive tapes are particularly preferred in accordance with the invention. Such a pressure-sensitive carrier-free transfer adhesive tape of the invention enables very exact bonding in terms of positioning and dosage.

Also possible are adhesive tapes where not two liners but a single double-sidedly separating liner is applied. In that case, the adhesive tape web has been covered on its top side with one layer of a double-sidedly separating liner, and on its bottom side with the reverse side of the double-sidedly separating liner, especially an adjacent turn on a bale or roll.

The thickness of the pressure-sensitive adhesive, either in the form of a transfer adhesive tape or on a flat structure, is preferably between 1 µm and 2000 µm, further preferably between 5 µm and 1000 µm and more preferably between about 50 µm and 550 µm.

Layer thicknesses between 300 µm and 700 µm are required to bridge tolerances in the automotive industry, for example.

Layer thicknesses between 1 µm and 50 µm reduce the use of material. However, there is a resultant decrease in the bonding from the substrate.

Film Former Component A

The polyurethane polymer used in the film former component A may in principle be any polyurethane polymer known per se. In the context of the present invention, polyurethane polymers are understood to mean reaction products obtainable by the reaction of (A1) polyisocyanates and (A2) polyols.

Suitable polyisocyanates (A1) are aromatic, araliphatic, aliphatic or cycloaliphatic polyisocyanates. It is also possible to use mixtures of such polyisocyanates. Examples of suitable polyisocyanates are butylene diisocyanate, hexamethylene diisocyanate (HDI), isophorone diisocyanate (IPDI), 2,2,4 and/or 2,4,4-trimethylhexamethylene diisocyanate, the isomeric bis(4,4'-isocyanatocyclohexyl)methanes or mixtures thereof with any isomer content, isocyanatomethyl octane 1,8-diisocyanate, cyclohexylene 1,4-diisocyanate, phenylene 1,4-diisocyanate, tolylene 2,4- and/or 2,6-diisocyanate, naphthylene 1,5-diisocyanate, diphenylmethane 2,4'- or 4,4'-diisocyanate, triphenylmethane 4,4',4"-triisocyanate or derivatives thereof having urethane, isocyanurate, allophanates, biuret, uretdione, iminooxadiazinedione structure and mixtures thereof. Preference is given to hexamethylene diisocyanate, isophorone diisocyanate and the isomeric bis(4,4'-isocyanatocyclohexyl)methanes and mixtures thereof.

Preference is given to polyisocyanates or polyisocyanate mixtures of the type specified having exclusively aliphatically and/or cycloaliphatically bonded isocyanate groups. Also preferred are tolylene 2,4- and/or 2,6-diisocyanate. Very particularly preferred starting components (A1) are polyisocyanates or polyisocyanate mixtures based on HDI, IPDI and/or 4,4'-diisocyanatodicyclohexylmethane.

Also suitable as polyisocyanates (A1) are any polyisocyanates that are prepared by modification of simple aliphatic, cycloaliphatic, aromatic and/or aromatic diisocyanates, are formed from at least two diisocyanates and have uretdione, isocyanurate, allophanate, biuret, iminooxadiazinedione and/or oxadiazinetrione structure, as described, for example, in J. Prakt. Chem. 336 (1994) p. 185-200.

Suitable polyols (A2) have an OH functionality of ≥1.5 to ≥4. The polyols (A2) are preferably polymeric polyols, for example polyacrylate polyols, polyester polyols, polylactone polyols, polyether polyols, polycarbonate polyols, polyestercarbonate polyols, polyetherestercarbonate polyols, polyacetal polyols, polyolefin polyols and polysiloxane polyols. Preference is given to polyols within a molar mass range from ≥400 g/mol to 2500 g/mol with an OH functionality of ≥1.9 to ≥3.

The useful polycarbonates having hydroxyl groups are obtainable by reaction of carbonic acid derivatives, for example diphenyl carbonate, dimethyl carbonate or phosgene, with diols. Useful diols of this kind include, for example, ethylene glycol, propane-1,2- and -1,3-diol, butane-1,3- and -1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% by weight to 100% by weight of hexanediol, preferably hexane-1,6-diol and/or hexanediol derivatives, preferably those that have not only terminal OH groups but also ether or ester groups, for example products that have been obtained by reaction of 1 mol of hexanediol with at least 1 mol, preferably 1 to 2 mol, of caprolactone according to DE-A 1 770 245 or by esterification of hexanediol with itself to give di- or trihexylene glycol. The preparation of derivatives of this kind is known, for example, from DE-A 1 570 540. It is also possible to use the polyetherpolycarbonate diols described in DE-A 3 717 060.

The hydroxyl polycarbonates should preferably be linear. However, they may optionally be lightly branched through the incorporation of polyfunctional components, especially low molecular weight polyols. Suitable examples of these are glycerol, trimethylolpropane, hexane-1,2,6-triol, butane-1,2,4-triol, trimethylolpropane, pentaerythritol, quinitol, mannitol, and sorbitol, methylglycoside, 1,3,4,6-dianhydrohexitols.

Suitable polyether polyols are the polytetramethylene glycol polyethers that are known per se in polyurethane chemistry and can be prepared, for example, by polymerization of tetrahydrofuran by cationic ring opening.

Additionally suitable polyether polyols (A2) are the polyaddition products of ethylene oxide, propylene oxide, butylene oxide, styrene oxide or epichlorohydrin that have been prepared using starter molecules, and the mixed and graft polyaddition products thereof and the polyethers obtained by condensation of polyhydric alcohols or mixtures thereof and those obtained by alkoxylation of water, polyhydric alcohols, amines or amino alcohols. Preference is given to homopolyaddition and/or mixed polyaddition compounds of ethylene oxide and/or propylene oxide having a number-average molecular weight of 400 to 4000 Da, more preferably of 400 to 2500 Da, most preferably of 800 to 2000 Da. The average functionality of the polyether polyol is greater than 1.85, preferably from 1.88 to 3.

Particular preference is given to difunctional polyethers having a functionality of 1.92 to 2.05.

The proportion of ethylene oxide in the homopolyaddition and/or mixed polyaddition compounds of ethylene oxide and/or propylene oxide is 0% to 100%, preferably 0% to 30%, more preferably 0% to 10%.

In a particularly preferred embodiment of the present invention, the polyether polyol (A2) is a homopolyaddition product of propylene oxide having a molecular weight of 800 to 2000 Da and a functionality of 1.92 to 2.05.

Suitable polyester polyols are, for example, reaction products of polyhydric, preferably dihydric and optionally additionally trihydric, alcohols with polybasic, preferably dibasic, carboxylic acids. Rather than the free carboxylic acids, it is also possible to use the corresponding polycarboxylic anhydrides or corresponding polycarboxylic esters of lower alcohols or mixtures thereof to prepare the polyesters. The polycarboxylic acids may be aliphatic, cycloaliphatic, aromatic and/or heterocyclic in nature and may optionally be substituted, for example by halogen atoms, and/or unsaturated.

Particularly preferred polymeric polyols (A2) are polycarbonates and polyethers, most preferably polyethers.

Possible short-chain polyols, especially for chain extension and/or termination of the polyurethane prepolymer, may be monofunctional alcohols and monoamines. Preferred monoalcohols are aliphatic monoalcohols having 1 to 18 carbon atoms, for example ethanol, n-butanol, ethylene glycol monobutyl ether, 2-ethylhexanol, 1-octanol, 1-dodecanol or 1-hexadecanol. Preferred monoamines are aliphatic monoamines, for example diethylamine, dibutylamine, ethanolamine, N-methylethanolamine or N,N-diethanolamine and amines from the Jeffamine® M series (Huntsman Corp. Europe, Belgium) or amino-functional polyethylene oxides and polypropylene oxides.

Short-chain polyols that are likewise suitable are aminopolyols or polyamines having a molar mass below 400 g/mol, which are described in a large number in the corresponding literature. These are, for example:

a) alkanediols or -triols, such as ethanediol, propane-1,2- and -1,3-diol, butane-1,4- and -2,3-diol, pentane-1,5-diol, dimethylpropane-1,3-diol, hexane-1,6-diol, neopentyl glycol, cyclohexane-1,4-dimethanol, 2-methylpropane-1,3-diol, 2-ethyl-2-butylpropanediol, trimethylpentanediol, positionally isomeric diethyloctanediols, cyclohexane-1,2- and -1,4-diol, hydrogenated bisphenol A [2,2-bis(4-hydroxycyclohexyl)propane], 2,2-dimethyl-3-hydroxypropyl 2,2-dimethyl-3-hydroxypropionate, trimethylolethane, trimethylolpropane or glycerol, b) ether diols, such as diethylene diglycol, triethylene glycol, tetraethylene glycol, dipropylene glycol, tripropylene glycol, 1,3-butylene glycol or hydroquinone dihydroxyethyl ether, c) ester diols of the general formulae (I) and (II)

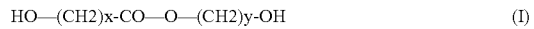

HO—(CH2)x-CO—O—(CH2)y-OH  (I)

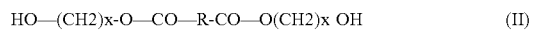

HO—(CH2)x-O—CO—R-CO—O(CH2)x OH  (II)

in which

R is an alkylene or arylene radical having 1 to 10 carbon atoms, preferably 2 to 6 carbon atoms, x is 2 to 6 and y is 3 to 5, for example δ-hydroxybutyl ε-hydroxycaproate, ω-hydroxyhexyl γ-hydroxybutyrate, β-hydroxyethyl adipate and β-hydroxyethyl terephthalate and d) di- and polyamines, for example 1,2-diaminoethane, 1,3-diaminopropane, 1,6-diaminohexane, phenylene-1,3- and -1,4-diamine, 4,4'-diphenylmethanediamine, isophoronediamine, isomer mixture of 2,2,4- and 2,4,4-trimethylhexamethylenediamine, 2-methylpentamethylendiamine, diethylenetriamine, 1,3- and 1,4-xylylenediamine, α,α,α,α'-tetramethyl-1,3- and -1,4-xylylenediamine, 4,4-diaminodicyclohexylmethane, amino-functional polyethylene oxides or polypropylene oxides obtainable under the Jeffamine® name, D series (from Huntsman Corp. Europe, Belgium), diethylenetriamine and triethylenetetramine. Suitable diamines in the context of the invention are also hydrazine, hydrazine hydrate and substituted hydrazines, for example N-methylhydrazine, N,N'-dimethylhydrazine and homologs thereof, and also acid dihydrazides, adipic acid, β-methyladipic acid, sebacic acid, hydracrylic acid and terephthalic acid, semicarbazido-alkylene hydrazides, for example β-semicarbazidopropionic hydrazide (described, for example, in DE-A 1 770 591), semicarbazidoalkylene carbazine esters, for example 2-semicarbazidoethyl carbazine ester (described, for example, in DE-A 1 918 504) or else aminosemicarbazide compounds, for example β-aminoethyl semicarbazidocarbonate (described, for example, in DE-A 1 902 931).

Preparation of the polyurethane polymer of the film former component A can be accomplished using all methods known from the prior art. Typically, the constituents are reacted with one another in stoichiometrically suitable ratios and preferably heated up to higher temperatures, especially in the range from 50 to 120° C.

The reaction can be effected in neat form or in solution. Suitable solvents are, for example, acetone, butanone, tetrahydrofuran, dioxane, acetonitrile, dipropylene glycol dimethyl ether and 1-methyl-2-pyrrolidone, which can be added not just at the start of the preparation, but can optionally also be added later in portions. Preference is given to acetone and butanone. It is possible to conduct the reaction under standard pressure or elevated pressure, for example above the standard pressure boiling temperature of a solvent such as acetone, for example.

In addition, it is possible to include the catalysts known for acceleration of the isocyanate addition reaction in the initial charge, or to meter them in at a later stage, examples of these being triethylamine, 1,4-diazabicyclo[2.2.2]octane, dibutyltin oxide, tin dioctoate, dibutyltin dilaurate, tin bis(2-ethylhexanoate), zinc dioctoate, zinc bis(2-ethylhexanoate) or other organometallic compounds. Preference is given to dibutyltin dilaurate, tin dioctoate and zinc bis(2-ethylhexanoate), particular preference to zinc bis(2-ethylhexanoate).

In the preparation of the polyurethane polymer, the molar ratio of isocyanate groups to isocyanate-reactive groups is, for example, 0.90 to 3. In the context of the present invention, it is possible to use either OH-functional or isocyanate-functional polyurethane polymers. The functionality can be controlled via the adjustment of the molar ratio of isocyanate groups to isocyanate-reactive groups.

The degree of reaction is typically monitored by following the NCO content of the reaction mixture. For this purpose, it is possible to undertake spectroscopic measurements, for example infrared or near infrared spectra, determinations of the refractive index or else chemical analyses, such as titrations, of samples taken. Polyurethane polymers containing free isocyanate groups are obtained in neat form or in solution.

In an advantageous development of the adhesive tape of the invention, the polyurethane polymer of the film former component A has a weight-average molecular weight $M_w$ of at least 40 000 g/mol, determined via gel permeation chromatography (GPC). Further preferably, the weight-average molecular weight $M_w$ is at least 50 000 g/mol, especially 50 000 to 1 000 000 g/mol. The use of such polyurethane polymers in the film former component A is particularly advantageous since this can prolong the open time after exposure of the polymerizable composition to radiation. Particularly suitable for this purpose are OH-functional polyurethane polymers. In gel permeation chromatography (GPC), THF (tetrahydrofuran) is used as eluent and is used with 0.1% by volume of trifluoroacetic acid. The measurement temperature is 25° C. A pre-column used is PSS-SDV, 5µ, $10^3$ Å, ID 8.0 mm×50 mm. For separation, the columns PSS-SDV, 5µ, $10^3$ and $10^5$ and $10^6$ each with ID 8.0 mm×300 mm are used. The sample concentration is 4 g/L; the flow rate is 1.0 mL per minute. Measurement is effected against polystyrene standards.

Moreover, the aforementioned polyurethane polymers advantageously contribute to the initial tackiness of the adhesive tape. Within the time window of the open time, this enables preliminary fixing of the components to be bonded to one another. This prevents the components from moving of their own accord from the desired bonding position. The aforementioned positive properties of the polyurethane polymer in the film former component A are especially marked in the case of use of linear polyurethane polymers, especially of linear OH-functional polyurethane polymers.

According to the invention, the radiation-activatable polymerizable composition contains 5 to 60 parts by weight of at least one film former component A, especially 10 to 50 parts by weight, preferably 15 to 40 parts by weight, where the parts by weight of components A and B add up to 100.

Epoxy Component B

Epoxy components B used may be epoxy-containing materials or epoxy resins, these being any organic compounds having at least one oxirane ring that are polymerizable by a ring-opening reaction. Such materials, which are generally referred to epoxides, include both monomeric and polymeric epoxides and may be aliphatic, cycloaliphatic or aromatic. These materials generally have an average of at least two epoxy groups per molecule, preferably more than two epoxy groups per molecule. The "average" number of epoxy groups per molecule is defined as the number of epoxy groups in the epoxy-containing material divided by the total number of epoxy molecules present.

The polymeric epoxides include linear polymers having terminal epoxy groups (e.g. a diglycidyl ether of a polyoxyalkylene glycol), polymers having skeleton oxirane units (e.g. polybutadiene polyepoxide) and polymers having epoxy side groups (e.g. a glycidyl methacrylate polymer or copolymer). The molecular weight of the epoxy-containing material may vary from 58 to about 100 000 g/mol or more. Mixtures of various epoxy-containing materials may also be used in the hotmelt compositions of the invention. Useful epoxy-containing materials include those that contain cyclohexene oxide groups, such as the epoxycyclohexane carboxylates, exemplified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. For a more detailed list of useful epoxides of this kind, reference may be made to U.S. Pat. No. 3,117,099.

Further epoxy-containing materials that are particularly useful in the application of this invention include glycidyl ether monomers. Examples are the glycidyl ethers of polyhydric phenols that are obtained by reaction of a polyhydric phenol with an excess of chlorohydrin, such as epichlorohydrin (e.g. the diglycidyl ether of 2,2-bis(2,3-epoxypropoxyphenol)-propane). Further examples of epoxides of this type that can be used in the application of this invention are described in U.S. Pat. No. 3,018,262.

There is a multitude of commercially available epoxy-containing materials that can be used in this invention. Especially suitable are epoxides, which are readily available, such as octadecylene oxide, epichlorohydrin, styrene oxide, vinylcyclohexene oxide, glycidol, glycidyl methacrylate, diglycidyl ethers of bisphenol A (for example those available under the trade names EPON 828, EPON 1004 and EPON 1001F from Shell Chemical Co. and DER-332 and DER-334 from Dow Chemical Co.), diglycidyl ethers of bisphenol F (e.g. ARALDITE GY281 from Ciba-Geigy), vinylcyclohexene dioxide (e.g. ERL 4206 from Union Carbide Corp.), 3,4-epoxycyclohexylmethyl 3,4-epoxycyclohexenecarboxylate (e.g. ERL-4221 from Union Carbide Corp.), 2-(3,4-epoxycyclohexyl-5,5-spiro-3,4-epoxy)-cyclohexane meta-dioxane (e.g. ERL-4234 from Union Carbide Corp.), bis(3,4-epoxycyclohexyl) adipate (e.g. ERL-4299 from Union Carbide Corp.), dipentene dioxide (e.g. ERL-4269 from Union Carbide Corp.), epoxidized polybutadiene (e.g. OXIRON 2001 from FMC Corp.), silicone resin-containing epoxy functionality, epoxysilanes (e.g. beta-(3,4-epoxycyclohexyl)ethyltrimethoxysilane and gamma-glycidoxypropyltrimethoxysilane, commercially available from Union Carbide), fire-retardant epoxy resins (e.g. DER-542, a brominated bisphenol-type epoxy resin, available from Dow Chemical Co.), butane-1,4-diol diglycidyl ether (e.g. ARALDITE RD-2 from Ciba-Geigy), hydrogenated epoxy resins based on bisphenol A epichlorohydrin (e.g. EPONEX 1510 from Shell Chemical Co.) and polyglycidyl ethers of phenol-formaldehyde novolak (e.g. DEN-431 and DEN-438 from Dow Chemical Co.).

In a further configuration of the adhesive tape of the invention, the epoxy component B contains at least 10% by weight of epoxy resins that are liquid at 25° C., based on the epoxy component B. The proportion of such liquid epoxy resins in the epoxy component B is especially 10% to 90% by weight, further preferably 20% to 75% by weight. Adhesive tapes having such ratios of liquid and solid epoxy components, in the uncured state, have particularly balanced adhesive properties. If what is desired is an adhesive tape having particularly good adaptation properties, the proportion of liquid epoxy components is preferably 50% to 80% by weight. For applications in which the adhesive tapes even in the uncured state have to bear a high load, a proportion of 15% to 45% is particularly preferred. It is possible to use such a resin or else a mixture of different resins.

A measure of flowability is dynamic viscosity. Dynamic viscosity in the present context is determined in a cylinder rotary viscometer with a standard geometry according to DIN 53019-1 (2008-09). Viscosity is measured at a measurement temperature of 25° C. and a shear rate of $1 \times s^{-1}$. Fluid refers to a substance having a viscosity of less than 500 Pa·s.

In addition, it is envisaged in the context of the present invention that the epoxy component B contains not more than 60% by weight of epoxycyclohexyl-based epoxy resins, especially from 5% to 80% by weight, further preferably from 15% to 60% by weight, based in each case on the epoxy component B. The use of liquid epoxycyclohexyl-based resins has an advantageous effect on the adhesive properties of the adhesives in the uncured state especially when 10% to 40% by weight thereof are used. If proportions of 50% to 80% by weight are used, it is possible by virtue of the high reactivity of the epoxycyclohexyl derivatives in combination with inventive component A to achieve fast-curing pressure-sensitive adhesives having short open times (>1 minute).

The epoxycyclohexyl-based epoxy resin may be selected, for example, from the group comprising or consisting of 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate, bis((3,4-epoxycyclohexyl)methyl) adipate, dicyclopentadiene dioxide, and combinations of these. These compounds are advantageous owing to their high reactivity. These compounds are frequently liquid, which leads to very soft adhesive tapes for high proportions of component B. If what are desired are firmer adhesive tapes, this can be achieved through the use of polymers having epoxycyclohexyl groups, obtainable, for example, via free-radical polymerization of 3,4-epoxycyclohexylmethyl methacrylate, optionally with comonomers.

The epoxy component B may have an average functionality based on the alkylene oxide groups of at least 1.0 to 6.0, especially of 1.75 to 3.2, in order to achieve high bond strength. The network density can be reduced by means of reactive diluents, which leads to less brittle adhesives, especially in the case of high proportions of component B. Such reactive diluents typically have a functionality of 1.0.

According to the invention, the radiation-activatable polymerizable composition contains 40 to 95 parts by weight of at least one epoxy component B, especially 50 to 90 parts by weight, preferably 60 to 85 parts by weight, where the parts by weight of components A and B add up to 100.

In a preferred embodiment of the adhesive tape of the invention, the epoxy component B contains at least two different epoxy resins B1 and B2, of which
a. the first epoxy resin B1 has a dynamic viscosity at 25° C. of less than 500 Pa*s, measured according to DIN 53019-1 at a measurement temperature of 25° C. and a shear rate of $1 \times s^{-1}$, and
b. of which the second epoxy resin B2 has a softening temperature of at least 45° C. or a dynamic viscosity at 25° C. of at least 1000 Pa*s, measured according to DIN 53019-1 at a measurement temperature of 25° C. and a shear rate of $1 \times s^{-1}$, where, in particular, the proportion of the first epoxy resin B1 is 10% to 90% by weight, preferably 20% to 75% by weight, and the proportion of the second epoxy resin B2 is 10% to 90% by weight, preferably 25% to 80% by weight, based on the epoxy component B.

Photoinitiators C

Among the photoinitiators C for cationic UV-induced curing, especially sulfonium-, iodonium- and metallocene-based systems are usable. By way of examples of sulfonium-based cations, reference is made to the remarks in U.S. Pat. No. 6,908,722 B1 (especially columns 10 to 21).

Examples of anions that serve as counterions for the abovementioned cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethyl-phenyl)borate, bi(trifluoromethylsulfonyl)amide and tris(trifluoromethylsulfonyl)methide. Also conceivable as anions, especially for iodonium-based initiators, are chloride, bromide or iodide, but preference is given to initiators that are essentially free of chlorine and bromine.

More specifically, the usable systems include
sulfonium salts (see, for example, U.S. Pat. No. 4,231,951 A, U.S. Pat. No. 4,256,828 A, U.S. Pat. No. 4,058,401 A, U.S. Pat. No. 4,138,255 A and US 2010/063221 A1) such as triphenylsulfonium hexafluoroarsenate, triphenylsulfonium hexafluoroborate, triphenylsulfonium tetra-fluoroborate, triphenylsulfonium tetrakis(pentafluorobenzyl)borate, methyldiphenyl-sulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexafluoroantimonate, 4-butoxyphenyldiphenylsulfonium tetrafluoroborate, 4-chlorophenyldiphenylsulfonium hexafluoroantimonate, tris(4-phenoxyphenyl)sulfonium hexafluorophosphate, di(4-ethoxyphenyl)methylsulfonium hexafluoroarsenate, 4-acetylphenyldiphenylsulfonium tetrafluoroborate, 4-acetylphenyldiphenylsulfonium tetrakis(pentafluorobenzyl)borate, tris(4-thiomethoxyphenyl)sulfonium hexafluorophosphate, di(methoxysulfonylphenyl)-methylsulfonium hexafluoroantimonate, di(methoxynaphthyl)methylsulfonium tetrafluoroborate, di(methoxynaphthyl)methylsulfonium tetrakis(pentafluorobenzyl)-borate, di(carbomethoxyphenyl)methylsulfonium hexafluorophosphate, (4-octyloxyphenyl)diphenylsulfonium tetrakis (3,5-bis(trifluoromethyl)phenyl)borate, tris[4-(4-acetylphenyl)thiophenyl]sulfonium tetrakis (pentafluorophenyl)borate, tris(dodecylphenyl) sulfonium tetrakis(3,5-bis(trifluoromethyl)phenyl) borate, 4-acetamidophenyldiphenylsulfonium tetrafluoroborate, 4-acetamidophenyldiphenylsulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis(pentafluorobenzyl)borate, phenylmethyl-benzylsulfonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate, iodonium salts (see, for example, U.S. Pat. No. 3,729,313 A, U.S. Pat. No. 3,741,769 A, U.S. Pat. No. 4,250,053 A, U.S. Pat. No. 4,394,403 A and US 2010/063221 A1) such as diphenyliodonium tetrafluoroborate,
di(4-methylphenyl)iodonium tetrafluoroborate,
phenyl-4-methylphenyliodonium tetrafluoroborate,
di(4-chlorophenyl)iodonium hexafluorophosphate,
dinaphthyliodonium tetrafluoroborate,
di(4-trifluoromethylphenyl)iodonium tetrafluoroborate,
diphenyliodonium hexafluorophosphate,
di(4-methylphenyl)iodonium hexafluorophosphate,
diphenyliodonium hexafluoroarsenate,
di(4-phenoxyphenyl)iodonium tetrafluoroborate,
phenyl-2-thienyliodonium hexafluorophosphate,
3,5-dimethylpyrazolyl-4-phenyliodonium hexafluorophosphate,
diphenyliodonium hexafluoroantimonate,
2,2'-diphenyliodonium tetrafluoroborate,
di(2,4-dichlorophenyl)iodonium hexafluorophosphate,
di(4-bromophenyl)iodonium hexafluorophosphate,
di(4-methoxyphenyl)iodonium hexafluorophosphate,
di(3-carboxyphenyl)iodonium hexafluorophosphate,
di(3-methoxycarbonylphenyl)iodonium hexafluorophosphate,
di(3-methoxysulfonylphenyl)iodonium hexafluorophosphate,
di(4-acetamidophenyl)iodonium hexafluorophosphate,
di(2-benzothienyl)iodonium hexafluorophosphate,
diaryliodonium tristrifluoromethylsulfonylmethide such as
diphenyliodonium hexafluoroantimonate,
diaryliodonium tetrakis(pentafluorophenyl)borate such as
diphenyliodonium tetrakis(pentafluorophenyl)borate,
(4-n-desiloxyphenyl)phenyliodonium hexafluoroantimonate,
[4-(2-hydroxy-n-tetradesiloxy)phenyl]phenyliodonium hexafluoroantimonate,
[4-(2-hydroxy-n-tetradesiloxy)phenyl]phenyliodonium trifluorosulfonate,
[4-(2-hydroxy-n-tetradesiloxy)phenyl]phenyliodonium hexafluorophosphate,
[4-(2-hydroxy-n-tetradesiloxy)phenyl]phenyliodonium tetrakis(pentafluorophenyl)borate,
bis(4-tert-butylphenyl)iodonium hexafluoroantimonate,
bis(4-tert-butylphenyl)iodonium hexafluorophosphate,
bis(4-tert-butylphenyl)iodonium trifluorosulfonate,
bis(4-tert-butylphenyl)iodonium tetrafluoroborate,
bis(dodecylphenyl)iodonium hexafluoroantimonate,
bis(dodecylphenyl)iodonium tetrafluoroborate,
bis(dodecylphenyl)iodonium hexafluorophosphate,
bis(dodecylphenyl)iodonium trifluoromethylsulfonate,
di(dodecylphenyl)iodonium hexafluoroantimonate,
di(dodecylphenyl)iodonium triflate,
diphenyliodonium bisulfate,
4,4'-dichlorodiphenyliodonium bisulfate, 4,4'-dibromodiphenyliodonium bisulfate,
3,3'-dinitrodiphenyliodonium bisulfate, 4,4'-dimethyldiphenyliodonium bisulfate,
4,4'-bis(succinimidodiphenyl)iodonium bisulfate, 3-nitrodiphenyliodonium bisulfate, 4,4'-dimethoxydiphenyliodonium bisulfate,
bis(dodecylphenyl)iodonium tetrakis(pentafluorophenyl)borate,
(4-octyloxyphenyl)phenyliodonium tetrakis(3,5-bis-trifluoromethylphenyl)borate and
(tolylcumyl)iodonium tetrakis(pentafluorophenyl)borate, and
ferrocenium salts (see, for example, EP 0 542 716 B1) such as $\eta_5$-(2,4-cyclopentadien-1-yl)-[(1,2,3,4,5,6,9)-(1-methylethyl)benzene]iron.

Examples of commercialized photoinitiators are Cyracure UVI-6990, Cyracure UVI-6992, Cyracure UVI-6974 and Cyracure UVI-6976 from Union Carbide, Optomer SP-55, Optomer SP-150, Optomer SP-151, Optomer SP-170 and Optomer SP-172 from Adeka, San-Aid SI-45L, San-Aid SI-60L, San-Aid SI-80L, San-Aid SI-100L, San-Aid SI-110L, San-Aid SI-150L and San-Aid SI-180L from Sanshin Chemical, SarCat CD-1010, SarCat CD-1011 and SarCat CD-1012 from Sartomer, Degacure K185 from Degussa, Rhodorsil Photoinitiator 2074 from Rhodia, CI-2481, CI-2624, CI-2639, CI-2064, CI-2734, CI-2855, CI-2823 and CI-2758 from Nippon Soda, Omnicat 320, Omnicat 430, Omnicat 432, Omnicat 440, Omnicat 445, Omnicat 550, Omnicat 550 BL and Omnicat 650 from IGM Resins, Daicat II from Daicel, UVAC 1591 from Daicel-Cytec, FFC 509 from 3M, BBI-102, BBI-103, BBI-105, BBI-106, BBI-109, BBI-110, BBI-201, BBI, 301, BI-105, DPI-105, DPI-106, DPI-109, DPI-201, DTS-102, DTS-103, DTS-105, NDS-103, NDS-105, NDS-155, NDS- 159, NDS-165, TPS-102, TPS-103, TPS-105, TPS-106, TPS-109, TPS-1000, MDS-103, MDS-105, MDS-109, MDS-205, MPI-103, MPI-105, MPI-106, MPI-109, DS-100, DS-101, MBZ-101, MBZ-201, MBZ-301, NAI-100, NAI-101, NAI-105, NAI-106, NAI-109, NAI-1002, NAI-1003, NAI-1004, NB-101, NB-201, NDI-101, NDI-105, NDI-106, NDI-109, PAI-01, PAI-101, PAI-106, PAI-1001, PI-105, PI-106, PI-109, PYR-100, SI-101, SI-105, SI-106 and SI-109 from Midori Kagaku, Kayacure PCI-204, Kayacure PCI-205, Kayacure PCI-615, Kayacure PCI-625, Kayarad 220 and Kayarad 620, PCI-061T, PCI-062T, PCI-020T, PCI-022T from Nippon Kayaku, TS-01 and TS-91 from Sanwa Chemical, Deuteron UV 1240 from Deuteron, Tego Photocompound 1465N from Evonik, UV 9380 C-D1 from GE Bayer Silicones, FX 512 from Cytec, Silicolease UV Cata 211 from Bluestar Silicones and Irgacure 250, Irgacure 261, Irgacure 270, Irgacure PAG 103, Irgacure PAG 121, Irgacure PAG 203, Irgacure PAG 290, Irgacure CGI 725, Irgacure CGI 1380, Irgacure CGI 1907 and Irgacure GSID 26-1 from BASF.

The skilled person is aware of further systems which can likewise be used in accordance with the invention. Photoinitiators are used uncombined or as a combination of two or more photoinitiators.

In a particularly preferred embodiment of the adhesive tape of the invention, the photoinitiator C contains a compound having tetrakis(pentafluorophenyl)borate anions. The photoinitiator C may also consist of at least one such compound. Compounds having the aforementioned anion are particularly advantageous since such a photoinitiator gives a distinctly elevated dark reaction, i.e. the adhesive tape cures more quickly after exposure to radiation. Surprisingly, in spite of the use of such rapid photoinitiators, a comparatively long open time of at least three minutes, especially at least five minutes, can be achieved, which— without being bound to a theory—is attributed to the interaction of these specific photoinitiators and the film former component of the invention with at least one polyurethane polymer.

According to the invention, the radiation activatable polymerizable composition contains 0.1 to 10 parts by weight of at least one photoinitiator C, especially 0.25 to 7.5 parts by weight, preferably 0.5 to 5 parts by weight.

A particularly preferred adhesive tape of the present invention comprises or consists of a radiation-activatable polymerizable composition having the following constituents:
  A 5 to 60 parts by weight, preferably 15 to 40 parts by weight, of the at least one film former component and/or
  B 40 to 95 parts by weight, preferably 60 to 85 parts by weight, of the at least one epoxy component and/or
  C 0.1 to 10 parts by weight, preferably 0.5 to 5 parts by weight, of the at least one photoinitiator and/or
  optionally D 0.1 to 200 parts by weight, preferably 10 to 100 parts by weight, of the at least one additive,
  where the parts by weight of components A and B add up to 100.

It is preferably a feature of the adhesive tape of the invention that the radiation-activatable polymerizable composition exhibits a dark reaction after radiative activation and especially has an open time of at least one minute after exposure to UV light, preferably an open time of 1 to 5 minutes, where the dark reaction at a temperature of 25° C. has concluded especially after 24 hours. A reaction in the context of this invention is referred to as "concluded" when the bond strength after 24 h is at least 2 MPa.

What is envisaged in accordance with the invention is that the adhesive tape is formed by the radiation-activatable polymerizable composition, i.e. essentially consists thereof. It may likewise be the case that the adhesive tape comprises at least one carrier layer, for example. In the case of such a carrier layer, it is possible in principle to use any material known to the person of average skill in the art in the field of production of adhesive tapes.

Useful examples for this purpose are polymer films or textile sheets composed, for example, of glass fibers, polymer fibers, quartz fibers, metal fibers, carbon fibers and/or natural fibers. Such a carrier layer is preferably positioned within the adhesive tape, i.e. not adjoining the main surfaces, in order that the surfaces of the adhesive tape that are of relevance to the bonding are formed essentially by the radiation-activatable polymerizable composition, i.e. can take part in the bonding over their full area.

Additives D

Useful additives D include all additives known to the person skilled in the art for adhesive tapes and pressure-sensitive adhesives, for example tackifying resins, called tackifiers, polymers, rheology modifiers, foaming agents, fillers, and adhesion promoters, polyols, aging stabilizers, light stabilizers, dyes, impact modifiers, phenoxy resins or mixtures of these.

Useful polymeric additives especially include elastomers or thermoplastics. It is also possible to use mixtures of different polymers.

Examples of elastomers as typically used in the field of pressure-sensitive adhesives are described inter alia in the "Handbook of Pressure Sensitive Adhesive Technology" by Donatas Satas (Satas & Associates, Warwick 1999). Usable examples include elastomers based on acrylates and/or methacrylates, polyurethanes, natural rubbers, synthetic rubbers such as butyl, (iso)butyl, nitrile or butadiene rubbers, styrene block copolymers having an elastomer block of unsaturated or partly or fully hydrogenated polydiene blocks (polybutadiene, polyisoprene, poly(iso)butylene, copolymers of these, and further elastomer blocks familiar to the person skilled in the art), polyolefins, fluoropolymers and/or silicones.

Thermoplastics used may, for example, be those polymers as mentioned in the textbooks "Chemie and Physik der synthetischen Polymere" [Chemistry and Physics of Synthetic Polymers] by J. M. G. Cowie (Vieweg, Braunschweig) and "Makromolekulare Chemie" [Macromolecular Chemistry] by B. Tieke (VCH Weinheim, 1997). These are, for example, poly(ethylene), poly(propylene), poly(vinyl chloride), poly(styrene), poly(oxymethylene), poly(ethylene oxide), poly(ethylene terephthalate), poly(carbonate), poly (phenylene oxides), poly(urethanes), poly(ureas), acrylonitrile-butadiene-styrene (ABS), poly(amides) (PA), poly(lactate) (PLA), poly(etheretherketone) (PEEK), poly(sulfone) (PSU), poly(ethersulfone) (PES). Poly(acrylates), poly (methacrylates) and poly(methyl methacrylates) (PMMA) are likewise possible as polymer, but are not preferred in the context of the present invention.

The selection of the polymer component depends on the epoxy system chosen. If polar epoxides (frequently prepared by reaction of alcohols with epichlorohydrin, for example the reaction product of bisphenol A and epichlorohydrin) are used, preference is given especially to polar polymers. These include both elastomers such as acrylonitrile-butadiene rubbers and thermoplastics such as poly(ethylene oxide), poly (ethylene terephthalate), poly(carbonates), poly(phenylene oxides), poly(urethanes), poly(ureas), poly(amides) (PA), poly(lactate) (PLA), poly(etheretherketone) (PEEK), poly(sulfone) (PSU) and poly(ethersulfone) (PES).

For less polar epoxides, for example dicyclopentadiene diepoxide, less polar polymers are preferred. These are, for example, poly(styrene), styrene block copolymers having an elastomer block of saturated or partly or fully hydrogenated polydiene blocks (polybutadiene, polyisoprene, poly(iso)butylene, copolymers of these, and further elastomer blocks that are familiar to the person skilled in the art) or thermoplastic polyolefins, fluoropolymers and/or silicones.

In order to obtain adhesive tapes having particularly high epoxy contents, particularly suitable polymers are all of those that are not intrinsically pressure-sensitively adhesive, i.e. do not fulfill the Dahlquist criterion at room temperature (cf. J. Adhesion, 1991, Vol. 34, pp. 189-200 or C. A. Dahlquist: Tack, adhesion, fundamentals and practice, McLaren and Sons Ltd., London, 1966). This applies both to the polymer component and to the mixture of polymer and tackifying resin, if one is used.

Particularly advantageous polymers for very high bond strengths are poly(amides), polyurethanes and poly(ureas), poly(etheretherketone) (PEEK), poly(sulfone) (PSU) and poly(ethersulfone) (PES).

If polyurethanes are used, these have been found to be particularly advantageous for good bonding forces in the uncured state when the polyurethane is semicrystalline and has a melting or crystallization in the DSC analysis that corresponds to an enthalpy of fusion of at least 5 J/g, preferably of 20 J/g and more preferably of 40 J/g.

The polymers of the polymer mixture may be of linear, branched, star-shaped or grafted structure, to give just a few examples, and may be in the form of a homopolymer, of a random copolymer, of an alternating polymer or of block copolymers. The term "random copolymer" in the context of this invention does not just include those copolymers in which the comonomers used in the polymerization are incorporated purely randomly, but also those in which there are gradients in the comonomer composition and/or local enrichments of individual types of comonomer in the polymer chains. Individual polymer blocks may also take the form of a copolymer block (random or alternating).

For the present invention, it is possible to use tackifying resins, but a tackifying resin is dispensable in respect of the adhesives of the present invention. Even without addition of tackifying resin, the desired tackiness of the adhesive is achieved.

If tackifying resins are used, suitable tackifying resins for this purpose are those as known to the person skilled in the art, for example from the Satas. The pressure-sensitive adhesive in this case may contain at least one kind of a preferably at least partly hydrogenated tackifying resin, for example those that are compatible with the elastomer component or, if a copolymer formed from hard and soft blocks is used, mainly with the soft block (soft resins).

A corresponding tackifying resin may have a softening temperature measured by means of the ring & ball method of greater than 25° C., and additionally include at least one kind of tackifying resin having a softening temperature of less than 20° C. In this way, if necessary, it is first possible to finely adjust the adhesive characteristics, but secondly also the adaptation characteristics on the bonding substrate.

For comparatively nonpolar elastomers, the resins used in the pressure-sensitive adhesive may be partially or fully hydrogenated resins based on rosin and rosin derivatives, hydrogenated polymers of dicyclopentadiene, partially, selectively or fully hydrogenated hydrocarbon resins based on $C_5$, $C_5/C_9$ or $C_9$ monomer streams, polyterpene resins based on α-pinene and/or β-pinene and/or δ-limonene and/or $\Delta^3$-carene, hydrogenated polymers of preferably pure $C_8$ and $C_9$ aromatics. The aforementioned tackifying resins can be used either alone or in a mixture.

It is possible here to use either resins that are solid at room temperature or liquid resins. In order to assure high aging stability and UV stability, preference is given to hydrogenated resins having a hydrogenation level of at least 90%, preferably of at least 95%.

Fillers used may, for example, be chalks, kaolins and silicates. Suitable thixotropic fillers are Aerosil and Socal chalks. The amounts used should be chosen such that the UV radiation required for curing can still penetrate sufficiently deep into the bond.

Further additives that may typically be utilized include:
  plasticizers, for example plasticizer oils, or low molecular weight liquid polymers, for example low molecular weight polybutenes, preferably with a proportion of 0.2% to 5% by weight based on the total weight of the pressure-sensitive adhesive
  primary antioxidants, for example sterically hindered phenols, preferably with a proportion of 0.2% to 1% by weight based on the total weight of the pressure-sensitive adhesive
  secondary antioxidants, for example phosphite or thioethers, preferably with a proportion of 0.2% to 1% by weight based on the total weight of the pressure-sensitive adhesive
  process stabilizers, for example C radical scavengers, preferably with a proportion of 0.2% to 1% by weight based on the total weight of the pressure-sensitive adhesive
  processing auxiliaries, preferably with a proportion of 0.2% to 1% by weight based on the total weight of the pressure-sensitive adhesive
  end block reinforcer resins, preferably with a proportion of 0.2% to 10% by weight based on the total weight of the pressure-sensitive adhesive, and
  optionally further polymers that are preferably elastomeric in nature; correspondingly utilizable elastomers include those based on pure hydrocarbons, for example unsaturated polydienes such as natural or synthetic polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogen-containing, acrylate-containing, allyl ether- or vinyl ether-containing polyolefins, preferably with a proportion of 0.2% to 10% by weight based on the total weight of the pressure-sensitive adhesive.

According to the invention, the radiation-activatable polymerizable composition optionally contains 0.1 to 200 parts by weight of at least one additive D, especially 50 to 150 parts by weight, preferably 10 to 100 parts by weight.

The present invention further relates to a method of joining two components by means of an adhesive tape of the invention, in which the adhesive tape is applied to the first component and then polymerization is activated by irradiating with radiation of suitable wavelength and the second component is placed on, wherein the polymerization for ultimate joining of the two components proceeds as a dark reaction and especially without additional thermal energy input from the outside.

The method of the invention also enables the bonding of substrates that are essentially opaque to UV light, since the adhesive tape of the invention, after activation by UV radiation or other high-energy radiation, for example, subsequently continues to react even after the radiation has been removed, i.e. exhibits a dark reaction. In this respect, it is unnecessary to irradiate the adhesive tape until it has ultimately cured through, and for that reason it is also possible to bond materials that are opaque to UV light or other radiation sources to one another. Consequently, it is a feature of an advantageous configuration of the method of the invention that the components have a UV transparency of less than 1%, especially virtually 0%, at a material thickness of 1 cm.

The present invention further provides for the use of an adhesive tape of the invention for joining two components, especially two components that have a UV transparency of less than 1% at a material thickness of 1 cm.

The adhesive tapes of the invention can be used in various sectors. Examples include applications in the automotive sector, for example the bonding of single-point mounts, for example for securing of sensors or rear-view mirrors on glass panes. In addition, applications in the electronics sector are possible, for example bonds in portable devices such as mobile phones or tablets. The adhesive tapes of the invention are also usable for bonding of single-point mounts in other sectors, for example for transparent panels in fume hoods, staircases or in composite construction.

The present invention is discussed in detail hereinafter with reference to working examples.

EXAMPLES

Test methods
Viscosity

The flowability of the fluid coating material is determined via the dynamic viscosity. Dynamic viscosity is determined in the present case in a cylinder motor viscometer having a standard geometry according to DIN 53019-1 (2008-09). Viscosity is measured at a measurement temperature of 25° C. and a shear rate of $1 \times s^{-1}$. A fluid refers to a substance having a viscosity of less than 500 Pa·s.

Molecular Weight:

Molecular weight determinations of the number-average molecular weights $M_n$ and the weight-average molecular weights $M_w$ were determined by means of gel permeation chromatography (GPC). The eluent used was THF (tetrahydrofuran) with 0.1% by volume of trifluoroacetic acid. The measurement temperature was 25° C. A pre-column used was PSS-SDV, 5µ, $10^3$ Å, ID 8.0 mm×50 mm. For separation, the columns used were PSS-SDV, 5µ, $10^3$ and $10^5$ and $10^6$ each with ID 8.0 mm×300 mm. The sample concentration was 4 g/L, the flow rate 1.0 mL per minute. Measurement was effected against polystyrene standards.

Bonding Force:

Bonding forces on steel were determined analogously to ISO 29862:2007 (Method 3) at 23° C. and 50% relative humidity at a peel rate of 300 mm/min and a peel angle of 180°. The reinforcing film used was an etched PET film having a thickness of 36 µm, as obtainable from Coveme (Italy). The bonding of a test strip of width 2 cm was undertaken here by means of a 4 kg roll-on machine at a temperature of 23° C. The adhesive tapes were peeled off immediately after application. The measurement (in N/cm) was found as the average from three individual measurements.

Bond Strength:

As an index for the quality of the bond achieved, the bond strength of a bond produced by the method of the invention was ascertained for the different adhesive tapes. For this purpose, the bond strength was determined quantitatively in each case in a dynamic tensile shear test in accordance with DIN-EN 1465 at 23° C. and 50% RH for a testing speed of 10 mm/min (results in $N/mm^2$=MPa). The test specimens used were those made of steel, which were cleaned with acetone prior to the bonding. The layer thicknesses of the adhesive tapes corresponded in each case. The average from three measurements is reported. Prior to the bonding of the second steel substrate, the curing reaction was activated with UV light (dose: 80 $mJ/cm^2$, lamp type: undoped mercury source). The measurement was effected 24 h after the activation.

Open Time:

The open time was determined via the change in bond strength. For this purpose, test substrates were prepared as in the "Bond strength" section above and the adhesive tape was bonded to the first substrate. After the irradiation, the time until joining of the second substrate was varied. The open time is that time in which the bond strength measured goes below 90% of the bond strength for a substrate bonded immediately after irradiation. The time required for joining is about 30 seconds and is subtracted therefrom.

Materials Used

| | |
|---|---|
| Desmomelt 530 | Largely linear hydroxyl polyurethane. Desmomelt 530 is a highly crystallizing, elastic polyurethane of very low thermoplasticity from Covestro. The enthalpy of fusion measured by DSC is 54.7 J/g. |
| Oppanol B 150 | Polyisobutylene (PIB) from BASF, Mn = 425 000 g/mol |
| Polyacrylate 1 | Pressure-sensitively adhesive acrylate copolymer of 2-hydroxyethyl acrylate, 2-ethylhexyl acrylate and C-17 acrylate, $M_n$ = 884 000 g/mol |
| Araldite ECN 1299 | Solid epoxy-cresol novolak from Huntsman having a softening temperature (DIN519219) of 85-100° C. |
| Epon Resin 828 | Difunctional bisphenol A/epichlorhydrin liquid epoxide having a weight per epoxide of 185-192 g/eq from Momentive. Viscosity at 25° C. of 12-14 Pa s. |
| Uvacure 1500 | Liquid cycloaliphatic diepoxide from Dow having a melting point of −37° C. and a viscosity at 23° C. of 0.25 Pa s. 3,4-Epoxycyclohexylmethyl 3,4-epoxycyclohexanecarboxylate, CAS: 2386-87-0) |
| Irgacure PAG 290 | Cationic photoinitiator from BASF. The counterion is a tetrakis(pentafluorophenyl)borate anion. |
| Triarylsulfonium hexafluoroantimonate | Cationic photoinitiator from Sigma-Aldrich (CAS: 109037-75-4). The photoinitiator has an absorption maximum in the range of 320 nm to 360 nm and was in the form of a 50% by weight solution in propylene carbonate. |

| | | Triarylsulfonium hexafluorophosphate | Cationic photoinitiator from Sigma-Aldrich (CAS: 109037-77-6) the photoinitiator has an absorption maximum in the range of 320 nm to 360 nm and was in the form of a 50% by weight solution in propylene carbonate. |

Preparation of Polyacrylate 1

A 2 L glass reactor of a conventional type for free radical polymerizations was charged with 40 g of 2-N-tert-butylacrylamide, 240 g of 2-ethylhexyl acrylate, 120 g of C17 acrylate (triply branched sides with C3, C4 chain segments, BASF SE), 133 g of 69/95 special boiling point spirit and 133 g of acetone. After nitrogen gas had been passed through the reaction solution while stirring for 45 minutes, the reactor was heated to 58° C. and 0.2 g of Vazo 67 (from DuPont) was added. Subsequently, the outer heating bath was heated to 75° C. and the reaction was conducted at this constant external temperature. After a reaction time of 1 h, 50 g of toluene were added. After 2.5 h, the mixture was diluted with 100 g of acetone. After a reaction time of 4 h, another 0.2 g of Vazo 67 was added. After a polymerization time of 7 h the mixture was diluted with 100 g of 60/95 special boiling point spirit, and after 22 h with 100 g of acetone. After a reaction time of 24 h, the polymerization was stopped and the reaction vessel was cooled down to room temperature. The molecular weight $M_n$ was 884 000 g/mol.

Production of the Pressure-Sensitive Adhesives

The pressure-sensitive adhesives were produced in the laboratory by dissolving the respective polymer in butanone at 23° C. Subsequently, the reactive resin(s) was/were added. Thereafter, the UV initiator was added by means of stirring.

For production of adhesive layers, i.e. of the carrier-free (pressure-sensitive) adhesive tapes, the various adhesives were applied from a solution to a conventional liner (siliconized polyester film) by means of a laboratory coating device and dried. The adhesive layer thickness after drying is 100±10 μm. The drying was effected in each case first at RT for 10 minutes and at 105° C. for 10 minutes in a laboratory drying cabinet. The dried adhesive layers were in each case laminated immediately after drying with a second liner (siliconized polyester film with lower release force) on the open side.

The aforementioned components were used to produce the inventive adhesive tapes K1-K4 which follow, and, for comparison, adhesive tapes V1 to V4. The adhesive tape V4 was produced in accordance with EP 1 518 912 A1 with a polyester 1 specified as preferred therein. This is the polyester used in example 12 of EP 1 518 912 A1, which was obtained via copolymerization of 25 mol % of terephthalic acid, 25 mol % of isophthalic acid, ethylene glycol, 17.5 mol % of neopentyl glycol, 17.5 mol % of ethylene glycol adduct of bisphenol A and 25 mol % of tetramethylene ether glycol.

Composition of Pressure-Sensitive Adhesives, Open Time and Bond Strength

The following table summarizes the compositions of the adhesive tapes and their open time and bond strength, where the figures mean parts by weight:

| | | K1 | K2 | K3 | K4 | V1 | V2 | V3 | V4 |
|---|---|---|---|---|---|---|---|---|---|
| Matrix | Desmomelt 530 | 20 | 20 | 20 | 20 | | | | |
| | Oppanol B 150 | | | | | 20 | | | |
| | Polyacrylat 1 | | | | | | 20 | 20 | |
| | Polyester 1 | | | | | | | | 20 |
| Epoxy resin | Epon Resin 828 | 40 | 40 | 40 | | 40 | 40 | | 80 |
| | Araldite ECN 1299 | 40 | 40 | 40 | 40 | 40 | 40 | 40 | |
| | Uvacure 1500 | | | | 40 | | | 40 | |
| Initiator | Irgacure PAG 290 | 1 | | | 1 | 1 | 1 | 1 | |
| | Triarylsulfonium hexafluoroantimonate | | 1 | | | | | | 1 |
| | Triarylsulfonium hexafluorophosphate | | | 1 | | | | | |
| Assessment | Open time/minutes | 5 | 11 | 18 | 1 | infinite | 0 | 0 | 0 |
| | Bond strength/MPa | 6.2 | 4.5 | 2.7 | 5.6 | <<1 MPa | n.m. | n.m. | n.m. |
| | Bonding force uncured (steel)/N/cm | 6.1 (A) | 5.9 (A) | 6.7 (A) | 4.3 (A) | (K) | (K) | (K) | 3.6 (A) |

* A: adhesive fracture, K: cohesive fracture;
** n.m. not measurable since curing too quick to join 2$^{nd}$ substrate The inventive adhesive tapes with adhesives K1-K2, after activation with UV light, have an open time of 5 minutes or more. By contrast, a comparable adhesive V1 without polyurethane component—but with polyisobutylene instead—has an infinite open time since there is no curing. It is likely that the very polar photoinitiator salts do not dissolve sufficiently well in the matrix which is very nonpolar as a result of the PiB, and so there is no adequate curing. Moreover, the adhesive is inhomogeneous owing to the great differences in polarity of the PiB and the epoxides.

V2, by comparison with K1, contains a polyacrylate rather than the polyurethane. The curing here is so quick that the surface forms a film after only a few seconds and joining of the second substrate is no longer possible (zero open time).

Pressure-sensitive adhesive V4 (in accordance with EP 1 518 912 A1 examples 12 and 13) does have a comparable composition to K1 (20% film former, 80% epoxy component), but uses a polyester as film former. However, V4 shows zero open time. And this is even though a photoinitiator having curing kinetics much slower than the tetrakis (pentafluorophenyl)borate used in K1 is used.

In the comparison of K1, K2, K3 and K4, it becomes clear that sufficiently long open times are achieved with all initiators in combination with the film former of the invention. K1 achieves much higher bond strengths in this comparison, since there is probably better curing. Since at least K1 to K3 differ in the initiator only, it has thus been shown that photoinitiators with tetrakis(pentafluorophenyl)borate anion are particularly suitable in combination with the inventive film former component A.

The cyclic epoxide 3,4-epoxycyclohexylmethyl 3,4-epoxycyclohexanecarboxylate, owing to its high reactivity, is of particularly good suitability for cationic curing. K3 contains 40 parts of such an epoxide. Even though the initiator with the fastest counterion (PAG 290) is used, this pressure-sensitive adhesive after activation still has an open time of somewhat more than 1 minute (rounded down in the table). By contrast, V3 (polyurethane exchanged for polyacrylate) has zero open time.

The invention claimed is:

1. An adhesive tape comprising a radiation-activatable polymerizable composition comprising:
    5 to 60 parts by weight, based on a weight of the radiation-activatable polymerizable composition, of at least one film-former component;
    40 to 95 parts by weight, based on the weight of the radiation-activatable polymerizable composition, of at least one epoxy component, wherein the at least one epoxy component comprises at least one first epoxy resin and at least one second epoxy resin;
    the at least one first epoxy resin and the at least one second epoxy resin are different;
    the at least one first epoxy resin has a first dynamic viscosity at 25° C. of less than 500 Pa*s, measured according to DIN 53019-1 (2008-09) at a first measurement temperature of 25° C. and a first shear rate of $1 \times s^{-1}$;
    the at least one second epoxy resin has a softening temperature of at least 45° C. or a second dynamic viscosity at 25° C. of at least 1,000 Pa*s, measured according to DIN 53019-1 (2008-09) at a second measurement temperature of 25° C. and a second shear rate of $1 \times s^{-1}$;
    the at least one first epoxy resin is present at 10% to 90% by weight based on the weight of the at least one epoxy component; and
    the at least one second epoxy resin is present at 10% to 90% by weight based on the weight of the at least one epoxy component;
    0.1 to 10 parts by weight, based on the weight of the radiation-activatable polymerizable composition, of at least one photoinitiator; and
    optionally 0.1 to 200 parts, based on the weight of the radiation-activatable polymerizable composition, by weight of at least one additive,
    wherein:
    the parts by weight of the at least one film-former component and the at least one epoxy component add up to 100 parts;
    the at least one film-former component comprises at least one polyurethane polymer;
    the radiation-activatable polymerizable composition is capable of being polymerized without an additional external thermal energy input; and
    the adhesive tape is pressure-sensitive at room temperature.

2. The adhesive tape as claimed in claim 1, wherein the at least one polyurethane polymer has a weight-average molecular weight $M_w$ of at least 40,000 g/mol as determined by gel-permeation chromatography at 25° C. with a polystyrene as a standard, tetrahydrofuran is used as an eluent with 0.1% by volume of triflouroacetic acid, a sample concentration of 4 g/L, and a flow rate of 1.0 mL/min.

3. The adhesive tape as claimed in claim 1, wherein the at least one polyurethane polymer comprises a linear polyurethane polymer.

4. The adhesive tape as claimed in claim 1, wherein the at least one polyurethane polymer comprises an OH-functional polyurethane polymer.

5. The adhesive tape as claimed in claim 1, wherein:
    one of the at least one first epoxy resin and the at least one second epoxy resin is liquid at 25° C. and is present at at least 10% by weight of the at least one epoxy component.

6. The adhesive tape as claimed in claim 1, wherein:
    one of the at least one first epoxy resin and the at least one second epoxy resin is an epoxycyclohexyl-based epoxy resin and is present at no more than 60% by weight based on a weight of the at least one epoxy component.

7. The adhesive tape as claimed in claim 1, wherein:
    the at least one epoxy component has an average functionality of at least 1.5 to 6.0 based on the the at least one first epoxy resin and the at least one second epoxy resin.

8. The adhesive tape as claimed in claim 1, wherein:
    the at least one photoinitiator comprises a compound comprising an anion; and
    the anion comprises tetrakis(pentafluorophenyl)borate.

9. The adhesive tape as claimed in claim 1, wherein the radiation-activatable polymerizable composition exhibits a dark reaction after radiative activation where the dark reaction at a temperature of 25° C. has concluded.

10. The adhesive tape as claimed in claim 1, wherein the adhesive tape further comprises at least one carrier layer.

11. A method for joining a first component to a second component comprising:
    applying an adhesive tape according to claim 1 to a first component;
    activating a polymerization by irradiating the adhesive tape with ultraviolet radiation; and
    placing the second component on the adhesive tape,
    wherein the polymerization proceeds as a dark reaction.

12. The method as claimed in claim 11, wherein the first component has an ultraviolet transparency of less than 1% at a material thickness of 1 cm.

13. A method for joining to a second component a first component having an ultraviolet transparency of less than 1% at a material thickness of 1 cm, comprising joining the first component to the second component with an adhesive tape of claim 1.

14. The method as claimed in claim 11, wherein the polymerization proceeds without an additional external thermal energy input.

15. The adhesive tape as claimed in claim 1, wherein the radiation-activatable polymerizable composition has an open time of at least one minute after exposure to an ultraviolet light from an undoped mercury emitter with a dose of more than 80 mJ/cm$^2$.

16. An adhesive tape comprising a radiation-activatable polymerizable composition comprising:
    5 to 60 parts by weight, based on a weight of the radiation-activatable polymerizable composition, of at least one film-former component;
    40 to 95 parts by weight, based on the weight of the radiation-activatable polymerizable composition, of at least one epoxy component, wherein the at least one epoxy component comprises at least one first epoxy resin and at least one second epoxy resin;

the at least one first epoxy resin and the at least one second epoxy resin are different;

the at least one first epoxy resin has a first dynamic viscosity at 25° C. of less than 500 Pa*s, measured according to DIN 53019-1 (2008-09) at a first measurement temperature of 25° C. and a first shear rate of $1 \times s^{-1}$;

the at least one second epoxy resin has a softening temperature of at least 45° C. or a second dynamic viscosity at 25° C. of at least 1,000 Pa*s, measured according to DIN 53019-1 (2008-09) at a second measurement temperature of 25° C. and a second shear rate of $1 \times s^{-1}$;

the at least one first epoxy resin is present at 10% to 90% by weight based on the weight of the at least one epoxy component; and the at least one second epoxy resin is present at 10% to 90% by weight based on the weight of the at least one epoxy component; 0.1 to 10 parts by weight, based on the weight of the radiation-activatable polymerizable composition, of at least one photoinitiator; and optionally 0.1 to 200 parts, based on the weight of the radiation-activatable polymerizable composition, by weight of at least one additive, wherein:

the parts by weight of the at least one film-former component and the at least one epoxy component add up to 100 parts;

the at least one film-former component comprises at least one polyurethane polymer;

the radiation-activatable polymerizable composition is capable of being polymerized without an additional external thermal energy input;

the polymerizable composition completely cures at room temperature within 24 hours; and the adhesive tape is pressure-sensitive at room temperature.

* * * * *